United States Patent
Han et al.

(10) Patent No.: US 8,260,540 B2
(45) Date of Patent: Sep. 4, 2012

(54) SYSTEMS AND METHODS OF COMMUNICATION IN AN ASSISTED NAVIGATION SYSTEM

(75) Inventors: Shaowei Han, Palo Alto, CA (US); Wentao Zhang, Cupertino, CA (US)

(73) Assignee: Sirf Technology, Inc., San Jose, CA (US)

( * ) Notice: Subject to any disclaimer, the term of this patent is extended or adjusted under 35 U.S.C. 154(b) by 564 days.

(21) Appl. No.: 12/476,458

(22) Filed: Jun. 2, 2009

(65) Prior Publication Data
US 2009/0237300 A1    Sep. 24, 2009

Related U.S. Application Data

(63) Continuation-in-part of application No. 11/741,448, filed on Apr. 27, 2007, now Pat. No. 7,869,948.

(51) Int. Cl.
*G01C 21/00* (2006.01)
*G01S 19/25* (2010.01)

(52) U.S. Cl. .............. 701/400; 342/357.64; 342/357.66

(58) Field of Classification Search .......... 701/400, 701/468–471; 342/357.66, 357.64
See application file for complete search history.

(56) References Cited

U.S. PATENT DOCUMENTS

| | | | |
|---|---|---|---|
| 5,490,076 A * | 2/1996 | Rawicz et al. | 455/98 |
| 5,963,167 A | 10/1999 | Lichten et al. | |
| 6,085,128 A * | 7/2000 | Middour et al. | 701/13 |
| 6,157,621 A | 12/2000 | Brown et al. | |
| 6,437,734 B1 | 8/2002 | McBurney et al. | |
| 7,839,331 B2 * | 11/2010 | Zhang et al. | 342/357.66 |
| 2007/0024496 A1 | 2/2007 | Wright et al. | |

FOREIGN PATENT DOCUMENTS

WO    WO 00/13971 A2    3/2000
WO    WO 01/16618 A     3/2001

OTHER PUBLICATIONS

PCT Search Report dated Jul. 7, 2008.

* cited by examiner

*Primary Examiner* — Yonel Beaulieu
(74) *Attorney, Agent, or Firm* — Haynes and Boone, LLP

(57) ABSTRACT

Provided herein are methods and systems for efficient communication between a server and a client in an assisted navigation system. In one or more embodiments, the client, e.g., a GPS receiver, receives a set of parameters for a satellite from the server via a wireless or wired connection. The set of parameters includes a force parameter, initial condition parameters and time correction coefficients for the satellite. The receiver uses the received parameters in a numerical integration to compute the position of the satellite at a desired time. The set of parameters needed for the integration is small compared to current methods which require sending more data to the client. Thus these parameters require less communication resources to transmit. To further reduce the amount of data that needs to be transmitted, reference parameters may be subtracted from the original parameters before transmission from the server. The receiver is able to reconstruct the original parameters from the received parameters and the identically computed reference parameters. The parameters may be further compressed using data compression techniques.

14 Claims, 5 Drawing Sheets

SMS PROCESSING AT CLIENT DEVICE

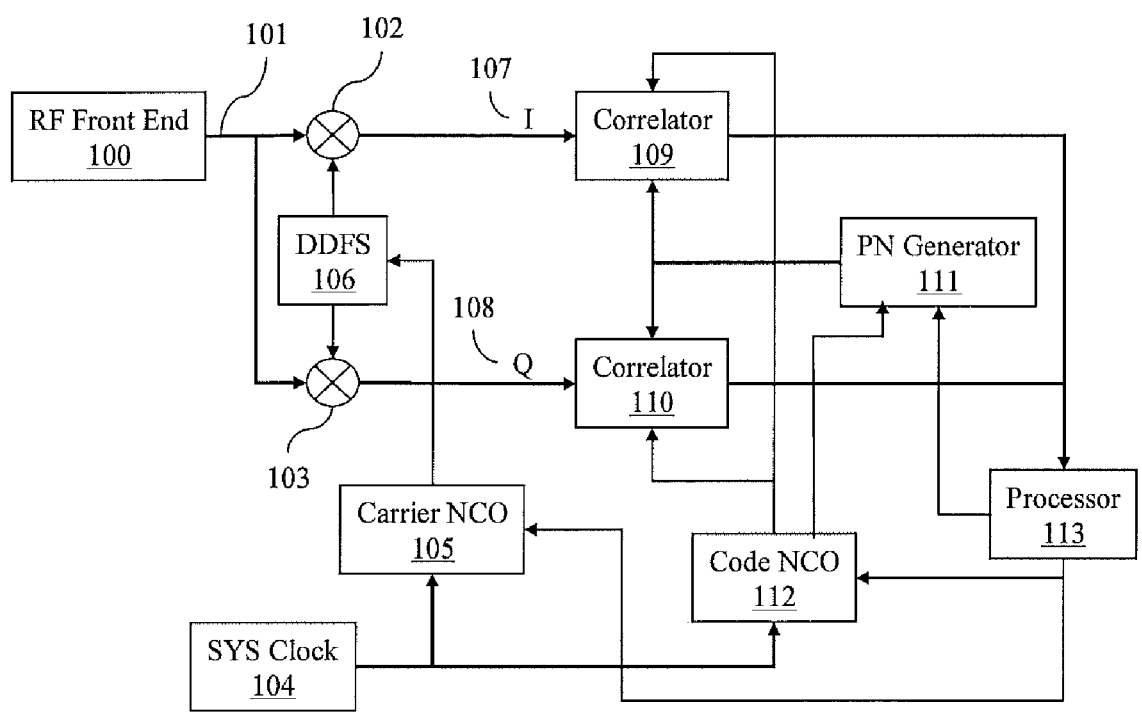
FIG. 1 A GPS baseband hardware

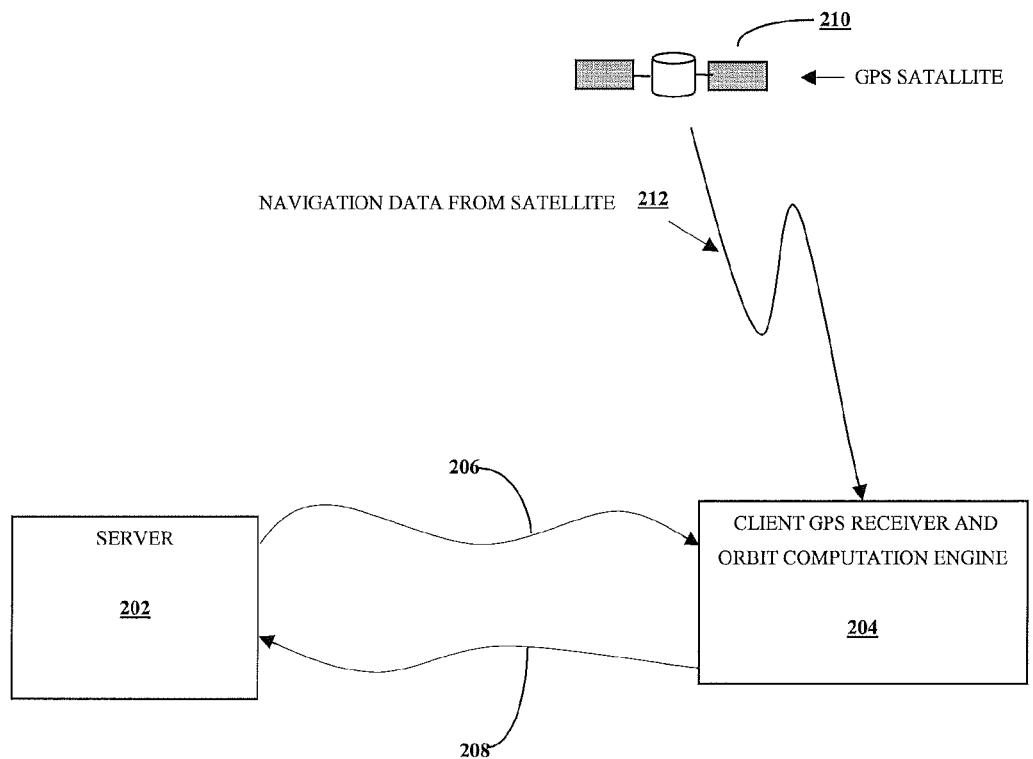
FIG 2  SERVER - CLIENT COMMUNICATION SYSTEM

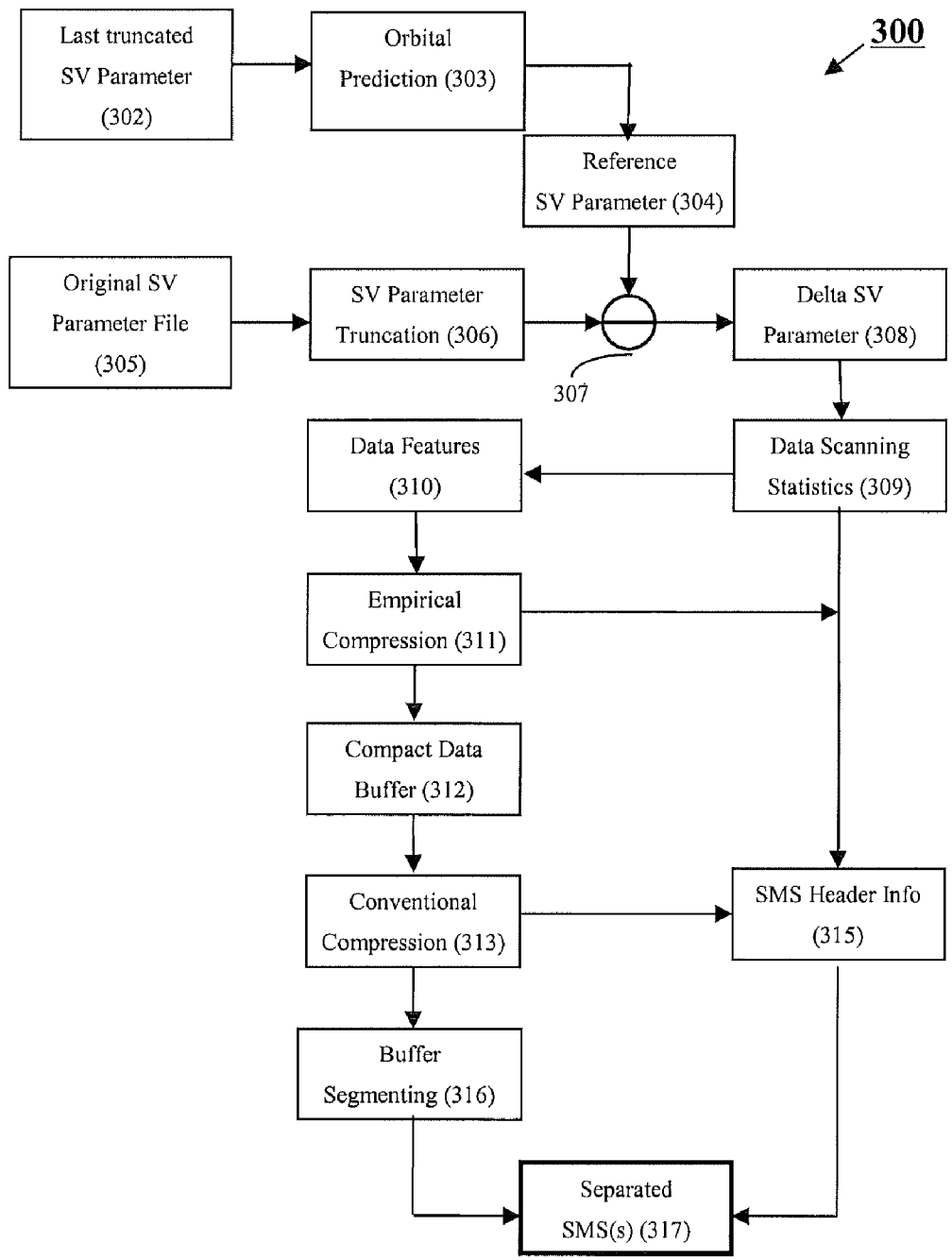
FIG. 3 SMS GENERATION IN THE SERVER

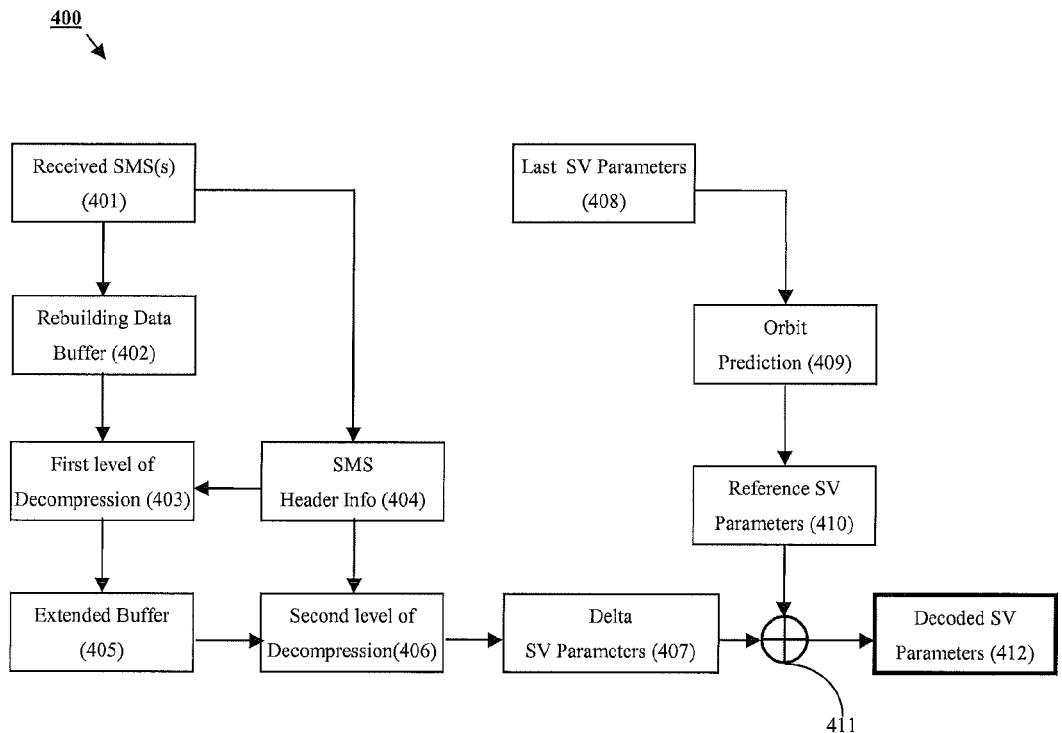
FIG. 4 SMS PROCESSING AT CLIENT DEVICE

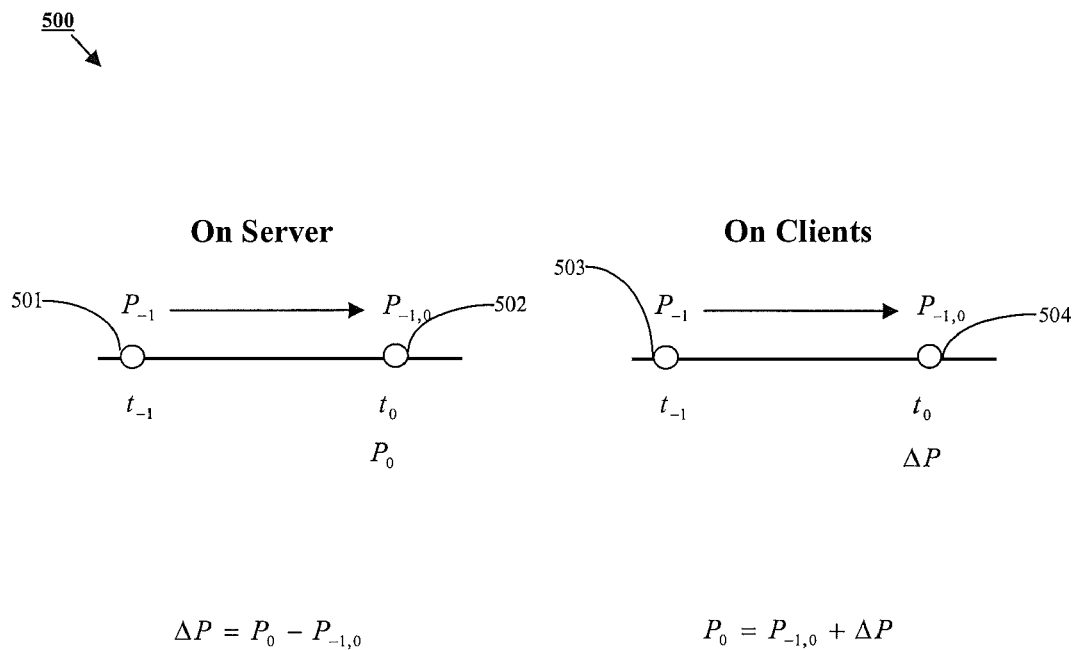
FIG. 5 REFERENCE SV PARAMETER GENERATION

SYSTEMS AND METHODS OF COMMUNICATION IN AN ASSISTED NAVIGATION SYSTEM

CROSS REFERENCE TO RELATED APPLICATION

This application is a Continuation-In-Part application of U.S. patent application Ser. No. 11/741,448, now U.S. Pat. No. 7,869,948 filed Apr. 27, 2007, the contents of which is hereby incorporated by reference in its entirety.

FIELD OF THE INVENTION

The present invention relates generally to navigational receivers, and more particular to systems and methods of communication between a server and a client in an assisted navigation system.

BACKGROUND OF THE INVENTION

With the development of radio and space technologies, several satellites based navigation systems have already been built and more will be in use in the near future. One example of such satellite based navigation systems is Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half-chip for most navigational satellite signal receivers. Thus the fall search range of code phase includes 2046 candidate code phases spaced by a half-chip interval. The carrier frequency search range depends upon the Doppler frequency due to relative motion between the satellite and the receiver. Additional frequency variation may result from local oscillator instability.

Coherent integration and noncoherent integration are two commonly used integration methods to acquire GPS signals. Coherent integration provides better signal gain at the cost of larger computational load, for equal integration times.

The signals from the navigational satellites are modulated with navigational data at 50 bits/second. This data consists of ephemeris, almanac, time information, clock and other correction coefficients. This data stream is formatted as sub-frames, frames and super-frames. A sub-frame consists of 300 bits of data and is transmitted for 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is always the same and is known as TLM word and the first eight bits of this TLM word are preamble bits used for frame synchronization. A Barker sequence is used as the preamble because of its excellent correlation properties. The other bits of this first word contain telemetry bits and is not used in the position computation. The second word of any sub-frame is the HOW (Hand Over Word) word and consists of TOW (Time Of Week), sub-frame ID, synchronization flag and parity with the last two bits of parity always being '0's. These two '0's help in identifying the correct polarity of the navigation data bits. The words 3 to 10 of the first sub-frame contains clock correction coefficients and satellite quality indicators. The 3 to 10 words of the sub-frames 2 and 3 contain ephemeris. The ephemeris is used to precisely determine the position of the GPS satellites. The ephemeris is uploaded every two hours and is valid for four hours to six hours. The 3 to 10 words of the sub-frame 4 contain ionosphere and UTC time corrections and almanac of satellites 25 to 32. These almanacs are similar to the ephemeris but give a less accurate position of the satellites and are valid for six days. The 3 to 10 words of the sub-frame 5 contain only the almanacs of different satellites in different frames.

The super-frame contains twenty five consecutive frames. The contents of the sub-frames 1, 2 and 3 repeat in every frame of a super-frame except for the TOW and the occasional change of ephemeris every two hours. Thus the ephemeris from the navigation data signal of a particular satellite contains only the ephemeris of that satellite repeating in every frame. However, almanacs of different satellites are broadcast in-turn in different frames of the navigation data signal of a given satellite. Thus the 25 frames transmit the almanac of all the 24 satellites in the sub-frame 5. Any additional spare satellite almanac is included in the sub-frame 4.

The almanacs and ephemeris are used in the computation of the position of the satellites at a given time. The almanacs are valid for a longer period of six days but provide a less accurate satellite position and Doppler compared to ephemeris. Therefore almanacs are not used when fast position fix is required. On the other hand, the accuracy of the computed receiver position depends upon the accuracy of the satellite positions which in-turn depends upon the age of the ephemeris. The use of current ephemeris results in better position estimation than one based on non-current or obsolete ephemeris. Therefore it is necessary to use current ephemeris to get a precise satellite position and hence the receiver position.

A GPS receiver may acquire the signals and estimate the position depending upon the already available information. In the 'hot start' mode the receiver has current ephemeris and the position and time are known. In another mode known as 'warm start' the receiver has non-current ephemeris but the initial position and time are known as accurately as in the case of previous 'hot start'. In the third mode, known as 'cold start', the receiver has no knowledge of position, time or ephemeris. As expected the 'hot start' mode results in low Time-To-First-Fix (TTFF) while the 'warm start' mode which has non-current ephemeris may use that ephemeris or the almanac resulting in longer TTFF due to the less accurate Doppler estimation or time required to download the new ephemeris. The 'cold start' takes still more time for the first position fix as there is no data available to aid signal acquisition and position fix.

It is not always possible to maintain a copy of current ephemeris in the receiver. This may be due to the fact that the receiver had no opportunity to download the ephemeris as it might have been powered off for duration longer than four hours or because the received signal is very weak. There are US patents directed to providing assistance in fast position fix. Most of these patents deal with providing the ephemeris to the receiver through a wireless or wireline means. However, the ephemeris are valid over a limited period and is therefore of no use when a longer validity of the ephemeris is expected. Some US patents and published US patent applications disclose methods of extending the validity of the ephemeris or orbit data. U.S. Pat. No. 6,437,734 discloses the transfer of navigation information from a server to the GPS receiver using a polynomial method. This transfer is accomplished through the Internet. U.S. Pat. No. 6,542,820 discloses a method of extrapolating the ephemeris based on the historical tracking data or ephemeris. However, the extrapolation of the ephemeris is done at a server and many sets of predicted satellite orbit parameters that cover several days are sent to the navigation receiver from the server. Published US patent application 2006/0055598 also discloses a similar method. However, these methods do not efficiently use communication resources because they require transmitting relatively large amounts of data to the receiver. Therefore, there is a need for more efficient communication between a server and a client in an assisted navigation system.

SUMMARY

Provided herein are methods and systems for efficient communication between a server and a client in an assisted navigation system.

In one or more embodiments of the present invention, the client, e.g., a GPS receiver, receives a set of parameters for a navigation satellite from the server via a wireless or wired connection. The set of parameters includes initial conditions for the satellite orbit and fitted coefficients for satellite clock at a particular time instance. The server collects or computes the set of parameters and transmits these parameters to the receiver. The receiver uses the set of parameters to compute the satellite position and clock, and then the receiver position.

The communication between the server and client may be in one direction (from server to client) or in both directions. In one or more embodiments of the present invention, the set of parameters for a satellite includes a force parameter, initial condition parameters, and time correction coefficients. The receiver uses the received parameters in a numerical integration to compute the position of the satellite at a desired time. The force parameter includes solar radiation pressure, and the initial condition parameters include satellite position and velocity at a particular time instance. The set of parameters needed for the integration is small compared to current methods which require transmitting a complete set of ephemeris, time, carrier phase, pseudorange, etc., for each satellite. Thus the set of parameters requires less communication resources to transmit compared to current methods.

To further reduce the amount of data that needs to be transmitted, in one or more embodiments of the present invention, reference parameters may be subtracted from the satellite parameters to obtain delta parameters, which are transmitted from the server to the client. The client is able to reconstruct the satellite parameters by adding the received delta parameters to the reference parameters. The reference parameters may be identically computed at the server and at the receiver from a previous set of parameters, an old alma-nac, or an old broadcast ephemeris. Also, the parameters may be compressed using one or more levels of compression prior to transmission.

The above and other embodiments of this invention will be apparent from the following more detailed description when taken in conjunction with the accompanying drawings.

BRIEF DESCRIPTION OF THE DRAWINGS

FIG. 1 is a block diagram illustrating an exemplary GPS receiver.

FIG. 2 illustrates a server-client communication system according to an embodiment of the present invention.

FIG. 3 illustrates a method of SMS generation in a server according to an embodiment of the present invention.

FIG. 4 illustrates a method of SMS processing at a client device according to an embodiment of the present invention.

FIG. 5 illustrates a method of SV parameter generation according to an embodiment of the present invention.

DETAILED DESCRIPTION

FIG. 1 illustrates an example of a navigation receiver. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component 1107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals takes place in the processor 113, as will be described in detail below. Additional details of the receiver baseband section described above are contained in U.S. patent application Ser.

No. 11/123,861 filed on May 6, 2005, the specification of which is incorporated herein by reference.

The DSP core 113 receives one millisecond integrated (correlated) I and Q values from the GPS baseband section described above. In order to acquire a GPS signal in the DSP processor, all dwells (set of carrier frequency, code offset) are searched. This is a two-dimensional search. Coherent integration and non-coherent integration are two commonly used integration methods to acquire GPS signals. Coherent integration provides better signal gain at the cost of larger computational load, for equal integration times.

A GPS receiver uses down-loaded ephemeris to accurately compute the positions of the visible satellites. Based on these satellite positions, the position of the receiver is estimated. This computed position is more accurate if the ephemeris for each satellite is current. In the case of GPS, the ephemeris for each satellite is updated every two hours even though the ephemeris is valid for a period of four to six hours. If the ephemeris is used beyond four to six hours, the accuracies of the calculated satellite position and clock degrade significantly, which causes an offset in the pseudorange where the pseudorange is the estimated distance of the satellite from the receiver with no corrections applied for the receiver clock drift, atmospheric delay, etc. In addition to the shift in the receiver position, the estimated values of the Doppler and Doppler rate are also not accurate with non-current ephemeris, resulting in a longer search time with a longer Time-To-First-Fix (TTFF). Thus, it is desirable to download and use current ephemeris to minimize this position error and the TTFF. However, it is not always possible to have current ephemeris in the memory of the GPS receiver. One example is the case of a morning commute to the office where the GPS receiver is powered off at the office for the remainder of the day and is not powered back on until the evening for the commute back home. The time gap in this case is more than four hours and the ephemeris stored in the receiver becomes non-current. Use of this non-current ephemeris not only increases the TTFF but also results in a position estimation with a shift and therefore proper vehicle navigation can not be initiated. Further, there is considerable delay if the receiver downloads new ephemeris from each of the satellites involved. This download requires at least eighteen seconds or more for each satellite after the start of the signal tracking process. Further, the broadcast ephemeris needs to be separately downloaded from each of the visible satellites. Also, in some cases the receiver may have to operate without downloading ephemeris for several weeks.

To overcome the above problems associated with non-current ephemeris, methods for generating sets of more precise ephemeris that are valid over a longer time interval, extending over several days, may be employed. This new set of 'generated ephemeris' or 'synthetic ephemeris' can be based on one of the several public domain databases on navigation satellites. Some of the typical data available from these databases include information on satellite mass, solar radiation pressure on satellites, accurate satellite position and velocity at a given time instance, satellite clock, clock correction co-efficient, etc. Public domain database services are available from many organizations with or without subscription fees. These organizations include the International GPS Service (IGS), International Earth Rotation and Reference Systems service, and Jet Propulsion Laboratory (JPL) of NASA. In the prior art, the satellite information is used to generate the ephemeris at a server. The generated ephemeris is then sent to remote navigation receivers. A drawback of this approach is that a server is required to compute the ephemeris and a large amount of communication resources are needed to transmit the server generated ephemeris to the remote navigation receivers.

In contrast, embodiments of the present invention enable a remote navigation or GPS receiver to receive a relatively small data set from the database and generate ephemeris at the receiver using the data set. As a result, there is no need for computations at the server to generate ephemeris. Further, the remote navigation or GPS receiver can obtain the needed data directly from the databases, in which case a separate sever is not needed. The data set is also relatively small and does not require a large amount of communication resources to send to remote receivers. Additional details can be found in U.S. patent application Ser. No. 11/741,448 titled, "A Method And Apparatus In Positioning Without Broadcast Ephemeris" filed on Apr. 27, 2007, the specification of which is incorporated herein by reference. This application provides 'synthetic ephemeris' for computing satellite position based on the following double integration:

$$x(t_m) = x(t_0) + \int_0^m \left( \int_0^t \ddot{x}(t) dt + \dot{x}(t_0) \right) dt$$

where $x(t_m)$ is the satellite position at a given time, $x(t_0)$ is the satellite position at time $t_0$, $\ddot{x}(t)$ represents total forces as a function of time and $\dot{x}(t_0)$ is the satellite velocity at time $t_0$.

In one embodiment, a data set comprises 13 parameters of information per satellites. Table 1 shows the 13 parameters of information, which includes three parameters for position of the satellite $x(t_0)$, and three parameters for the velocity of the satellite $\dot{x}(t_0)$, both at a given time instance. The 13 parameters also includes three parameters for 'solar radiation pressure', which is a force exerted on the satellite, and three parameters for time correction coefficients and a reference time. The number of solar radiation pressure parameters can be more depending on the solar radiation model being used. Table 1 lists the different parameters in the data set. The satellite position at a given time instance includes one parameter for each of the x, y, and z dimensions for a total of three parameters as shown in Table 1. The same applies to the satellite velocity at a given time instance. The parameters can be further compressed when they are transmitted.

TABLE 1

| | Parameter Components | | | |
|---|---|---|---|---|
| Parameter | x | y | z | Parameters |
| Satellite Position | 1 | 1 | 1 | 3 |
| Satellite Velocity | 1 | 1 | 1 | 3 |
| Solar Pressure | | | | 3* |
| Time Correction Coefficients and reference time | | | | 4 |
| Total Parameters | | | | 13 |

*The number of solar radiation parameters depends on the model being used, e.g., 0 parameter model, or 1 parameter model, or 3 parameter model, or 9 parameter model, or others.

The satellite position and velocity, $x(t_0)$ and $\dot{x}(t_0)$, respectively, at the given time instance can be used in the double integration given above to compute satellite position at a given time. The solar radiation parameters can be incorporated into the forces, $\ddot{x}(t)$, acting on the satellite.

The satellite clock bias may be computed using the time correction coefficients as follows:

$$tc = a0 + a1 \cdot dt + a2 \cdot dt^2$$

where a0, a1, a2 are the 0, 1st, and 2nd order time correction coefficients at the reference time, respectively, dt is the time difference between the desired time and the reference time, and tc is the satellite clock bias at the desired time. The second order coefficient may be omitted. In an embodiment, the server computes the time correction coefficients by fitting a mathematical model to historical values of the clock bias over a period of time. The model may be linear first order, second order or higher order. The server may fit several different models to the historical data and select the model that best fits the historical data. In this embodiment, the server sends the coefficients of the model to the receiver for computing the clock bias. To avoid error due to clock jumps, the server may scan the historic data for clock jumps and use a period of time after the clock jump for modeling the clock bias.

Since the data set containing the parameters is relatively small, the data set can be sent to the receiver in a short message, such as a SMS (Short Message Service) message on a programmed and periodic basis. Thus, the receiver may obtain the data on, e.g., a daily basis, weekly basis, etc.

FIG. 2 shows a server-client communication system according to an embodiment of the invention. The client 204 may be a GPS receiver that communicates with the server 202 through a wired link or a wireless link 206, e.g., cellular communications link. The client 204 may send a message to the server 202 requesting the satellite vehicle (SV) parameters (e.g., parameters listed in Table 1) at a given time and for a set of satellites through the communications link 208. The client also can receive navigation data 212 from GPS satellites 210 under favorable conditions. Favorable conditions include clear visibility of the satellites at the location of the client. If a sufficient number of satellites are not visible and/or the satellites signals are weak, the client 204 can communicate with the server 202 for the SV parameters in order to continue positioning. Upon receipt of the request from the client 204, the server 202 sends the requested SV parameters to the client 204, e.g., in an SMS message. Other message formats may also be used.

The communication between the server 202 and the client 204 can be one-way or two-way. When one-way communication is employed the communication is from the server 202 to the client 204 with no communication from client 204 to server 202. The client 204 passively receives the message from the server 202 after subscribing to the SMS. This mode functions with the lowest data compression ratio.

In the case of two-way communication mode both the server 202 and the client 204 communicate with each other. In this mode the client 204 periodically or once during a given period sends an SMS message to the server 202. The server 202 responds with an SMS message to the client 204, the contents of which depend on data requested in the SMS message from the client 204. Further, the server 202 may send SMS messages to clients periodically or upon request.

In a preferred embodiment, the data sent to the client is further reduced by taking differences between the SV parameters and reference SV parameters to generate delta SV parameters and sending the delta SV parameters to the client. The client reconstructs the original SV parameters by adding the received delta SV parameters to the reference SV parameters. In addition, the delta SV parameters may be further compressed.

FIG. 3 shows a method for generating SMS messages at a server according to an embodiment of the invention. In this embodiment, the data transfer is reduced by sending the delta SV parameters to the client, which the client applies to reference SV parameters to reconstruct the original SV parameters. In step 305, SV parameters are provided, which may be the same as those listed in Table 1 above. Some of the parameters in Table 1, e.g., solar radiation parameters, may be omitted to further reduce the amount of data. In step 305, the original SV parameters may be estimated at the server by a method known as SPGOD Standalone Predictive GPS Orbit Determination). Details of the SPGOD method can be found in U.S. patent application Ser. No. 11/558,614 titled, "Method and Apparatus In Standalone Positioning Without Broadcast Ephemeris," filed on Nov. 10, 2006, the specification of which is incorporated herein by reference. The server may also retrieve some of the SV parameters from a database, e.g., JPL database. In step 306, the SV parameters are truncated, in which the values of the parameters are truncated by removing some digits on the Least Significant Bits (LSB) side. This is preferably done so that the truncation does not affect the accuracy of the orbit prediction by a given value. The previous or the last truncated SV parameters 302 may be available both in the server and the client. If the last truncated SV parameters are not available in the client, then the next step 303 will be skipped and the reference SV parameters set to zero in step 304. If the last SV parameters were derived from ephemeris or almanac, then the satellite position/velocity/clock for a given reference time are directly calculated in step 303 using the ephemeris or almanac and the Solar Radiation Pressure (SRP) is set to zero. The last SV parameters may also be derived from the synthetic ephemeris, in which the satellite position/velocity for the given reference time are obtained through orbital integration with the corresponding step size and the satellite clock for the reference time using the corresponding parameters in the last SV parameter. Generation of reference SV parameters from old synthetic ephemeris will be further explained in FIG. 5. The previously sent SRP is used for the SRP at the reference time since SRP typically does not change much. Ideally, the reference SV parameters are as close as possible to the original truncated SV parameters at the reference time. In step 307 the difference between the truncated SV parameters and the reference SV parameters is obtained as the delta SV parameters, which is shown in step 308. The delta SV parameters may then be transmitted to the client. Alternatively, the delta SV parameters may be further compressed as described below.

In step 309, statistics of the delta SV parameters are scanned. In this data scanning data features are determined and information needed for the SMS header is collected. The data features in step 310 may include the value range of each delta SV parameter and data distribution characteristics. These are used in the first level data compression also known as empirical compression as shown in step 311. For example, the server may scan the range of values for an SV parameter and determine that the actual value range for the SV parameter is smaller than the value range allocated to the SV parameter. In this example, the server may reduce the value range for this SV parameter and normalize the reduced range to a reference value, thereby reducing the amount of data that needs to be sent for this SV parameter. This empirical compression is lossless. In another example, the server may determine that an SV parameter is periodic based on scanned values over a period of time. In this example, the server may model the SV parameter using a Fourier series and send the Fourier series to the receiver. The above empirical data compression may be performed through a flexible length or pre-coded data table. The bits of each parameter in the compressed delta SV parameter are extracted and entered into a data buffer as shown in step 312.

In step 313, the data in the buffer is subjected to a second level of compression. The second level of compression may use conventional compression techniques such as run length encoding, delta encoding, LZW compression or other known compression techniques. This second level compression further reduces the amount of data that needs to be transmitted. Information on the compression used is included in the SMS message header.

Only one of the two levels of compression may be used instead of both with information in the SMS header indicating which one of the two levels of compression was used at the server. Further, the server may skip both levels of compression. In addition to this information, a SMS identification number (ID) may be also placed in the SMS header. Other information available in the SMS header may include SV availability, compression methods, format identifier, model selection, reference time, etc.

In the step 316, individual SMS messages are formed by buffer segmenting, in which the information above may be transmitted over several messages if one SMS message can not hold all the information. In this buffer segmenting each of the SMS messages is stored in memory with a given number of bytes or bits. Finally, in the step 317, the separated SMS messages are ready for transmission in the binary format.

FIG. 4 shows a method of decoding received SMS messages and recovering the original SV parameters at a client. The SMS messages are received by the client in step 401. These SMS messages are put in a data buffer to rebuild the data as shown in step 402. In step 404, the SMS header information is obtained. The header information and the rebuilt data are then applied to a first level of decompression in step 403. This decompression corresponds to the second level compression of step 313 at the server. The header information facilitates decompression by indicating what type of compression was used at the server. The decompressed data is stored in the buffer in step 405. The second decompression corresponding to the empirical compression of step 311 is performed in step 406. This decompression also uses information in the SMS header of step 404. The decompression in step 406 results in the recovery of the delta SV parameters in step 407. The client device has the last SV parameters stored in memory as shown in step 408. The client uses the last SV parameters to compute the reference SV parameters in 410. The client adds the delta SV parameters of 407 with the SV reference parameter in step 411 to obtain the updated SV parameters in step 412.

FIG. 5 illustrates the generation of the reference SV parameters and delta SV parameters from the last SV parameters using old synthetic ephemeris. On the server side, the last time is denoted by $t_{-1}$ and the corresponding last SV parameter set is $P_{-1}$. The SV parameter set $P_{-1,0}$ at the server refers to the reference SV parameter at present time $t_0$ and is deduced from $P_{-1}$ through orbit prediction. $P_0$ represents the actual SV parameter set at $t_0$. The delta SV parameter $\Delta P$ is the difference between $P_0-P_{-1,0}$ and this is the data to be transmitted to the client device. On the client side, $P_{-1,0}$ is similarly computed from the last SV parameter set and the received delta SV parameter $\Delta P$ is added to the reference SV parameter set to obtain the actual SV parameter set $P_0$. The magnitude of $\Delta P$ is proportional to the time difference $(t_0-t_{-1})$ and may be small for several days. For this to be effective the client may need to send information to the server to indicate how the client determines the reference SV parameters so that the reference SV parameters at both the server and client are the same. For example, if the client uses an old ephemeris or almanac to determine the satellite position/velocity at the reference time, then the receiver may send information to the server indicating which ephemerides and/or almanac sets are available on the client device. In the case where old ephemerides are not available and only almanac are available on the client device, the magnitude of the delta SV parameter $\Delta P$ will be larger and the server should know which almanac set is available on the client device. In either case of using old ephemeris or old almanac to generate reference SV parameters, the delta SV parameters are not applicable to SRP. The identities of ephemerides on the client may be indicated by the corresponding satellite IDs and/or time stamps. Alternatively or in addition, the information may include which synthetic ephemerides are available on the client device, the reference time of each of these ephemerides and which SVs need to be updated.

In the above some of the characteristics of the satellite constellation may be used to reduce the amount of delta SV parameters to be transferred. These include the small variation in the sum of the earth radius and orbit altitude which allows the common value of the sum to be assumed at the client so that only the small variable portion has to be transmitted. The data bits in the elevation angles of the satellites can also be reduced by converting the azimuth and elevation angles with respect to a nominal orbit plane. In addition to the above, the relationship between the orbit altitude and orbit velocity may be used to reduce the number of bits to be transmitted. This relationship allows the receiver to determine the orbital velocity of a satellite based on its orbital altitude. Further, the relative positions of satellites in an orbital plane are approximately fixed. This relationship between satellites in the same orbital plane allows the receiver to use the position of one satellite in an orbital plane to approximate the positions of other satellites in the same orbital plane. In this example, the server may send the position of one satellite in an orbital plane to the receiver. For another satellite in the same orbital plane, the server may send to the receiver the difference between an accurate position of the other satellite and the approximate position of the other satellite determined by the receiver. This reduces the amount of data that needs to be transmitted. In the GPS constellation there are approximately six orbital planes with each orbital plane having four satellites.

Another possibility in reducing the data to be transferred is to use the trend in the history of the data change. The particular data to be transmitted may be collected over a long time and upper and lower values may be identified. The lower value need not be transmitted at all, only the normalized value with respect to the lower limit may be sent.

In another embodiment, models of the SV parameters may be pre-stored in the receiver with the receiver using one or more of the models to determine the reference SV parameters. In this embodiment, a model for an SV parameter may be created by fitting an empirical model to historical values of the SV parameters over a period of time. The model may be first, second or higher order with the coefficients of the model pre-stored in the receiver. The model may also be represented by a Fourier series. The receiver may have several different models for a particular SV parameter. In this embodiment, the server may select the model which provides the most accurate value for the corresponding SV parameter at the reference time. The server may then send a flag to the receiver to indicate which model to use for the reference SV parameter. The server may also select a model over other methods for computing a reference SV parameter (e.g., ephemeris, almanac, synthetic ephemeris) if the model results in a more accurate value for the SV parameter. Models may be pre-stored on the receiver before the receiver is sent to the customer and/or downloaded to the receiver.

The information communicated between the client and server may be listed as follows:

Clients to the Server
1. The list of the SVs requested to be updated.
2. The reference time of locally available almanacs or ephemerides or synthetic ephemerides.

The Server to the Clients
1. The delta SV parameters for all or specified SVs.
2. The delta SV parameters based on old almanacs or ephemerides or synthetic ephemerides.

Additional methods that may be used to reduce the amount of data transmitted are given below:

1. Dealing with reference time. Although different SVs can have different reference times depending on the observation availability, the reference time of all SVs can be synchronized to a fixed time of the day, e.g., 12:00 AM, through forward or backward orbital integration after the SV parameters are estimated. In this example, only the day is needed as the reference time in an encoded SMS message.

2. Dealing with missing SMS. It may be possible that some of the SMSs are missing on the client side. In this case, useful information should be recovered as much as possible using the remaining SMSs.

3. Dealing with different numbers of SVs. It may be possible that some SVs are absent in the decoded SMSs. A SV availability mask can be put in the SMS header, and the information of all the rest of the SVs can be placed sequentially. In the example, the SV availability mask indicates the absent SVs.

4. Dealing with different data lengths. Although expected to be of the same maximum value range and assigned the same number of bits, the actual values of the parameters could be different by of several orders of magnitude. Additional indicators can be used to flag the short-length parameters, and the number of assigned bits can be minimized. If there is a net benefit in bit reduction after full scanning of the data, this flexible-length method can be adopted in the empirical compression step 311 of FIG. 3.

5. Dealing with coordinate signs. The signs of the satellite coordinates could be omitted in the SMS message and recovered by using recent Almanac or Ephemeris.

6. Dealing with different models. Model flags can be adopted to indicate different SRP models and different satellite clock models (e.g., $1^{st}$ or $2^{nd}$ order).

7. Making use of history Statistics. The history of the SV Parameters for all SVs should be well studied in terms of the occurrence frequency of some data blocks, and changing trends of some parameters. For those data blocks having a high frequency of occurrence, they can be put in a hard-coded table and represented with short flags. The pre-coded data table can then be used in SMS encoding and decoding to reduce the data size. For example, the pre-coded data table can be adopted in the empirical compression step 311 of FIG. 3.

8. Grouping the SVs for transmission on different days. The GPS constellation can be carefully divided into several subsets with each subset giving the receiver the ability to do independent positioning. The different subsets may be sent on different days, and therefore reduce the data transmitted per day. For example, if the server knows a general area within which the receiver is located and times of the day that the receiver is typically used, then the server may determine the satellites that are likely to be observable to the receiver and send a subset corresponding to the likely observable satellites. In this example, the receiver may send the general location and time of use information to the server. The receiver may determine the time of use information based on the times of the day that the receiver is used over several days.

Depending on the past communication between the server and the client different reference SV parameters generation and SMS encoding/decoding scenarios are possible. Table 2 given below illustrates examples of different scenarios for generating reference SV parameters.

TABLE 2

Reference SV Parameter Generation Scenarios

| Client Scenarios | | | | |
| --- | --- | --- | --- | --- |
| Existing Resource | | | Most Recent Communication | Solutions on Server All the old Alm, Eph, Syn. Eph are available on Server |
| Alm | Eph | Syn. Eph | with Server | |
| / | / | / | Never | Case 1: Make use of constellation characteristics in generating reference SV Parameters for all SVs |
| >=6 Mon | / | / | >3 Months | Also regarded as Case 1 |
| <6 Mon | / | / | | Case 2: Using Almanac to generate reference SV Parameters for all SVs. |
| >=6 Mon | No | / | 12 days~3 Months | Also regarded as Case 1 |
| <6 Mon | <1 Mon | N | | Case 3: Using Almanac or Ephemeris whichever is newer to generate reference SV Parameters for all SVs |
| <6 Mon | <1 Mon | N | Within 12 days | Also regarded as Case 3 |
| / | / | <12 days | | Case 4: Using Synthetic Ephemeris to generate reference SV Parameters for all SVs |
| / | / | / | / | Case 5: Cases 1~4 are used to generate reference SV Parameters for different SVs |

Furthermore, the SV parameter truncation step 306 of FIG. 3 is conducted in terms of minimum necessary precision for each parameter. Table 3 list exemplary minimum precisions for SV parameters.

TABLE 3

Minimum Necessary Precision for SV Parameters

| | | |
|---|---|---|
| Orbital Position | X (m) | 1e−3 |
| | Y (m) | 1e−3 |
| | Z (m) | 1e−3 |
| Orbital Velocity | Vx (m/s) | 1e−5 |
| | Vy (m/s) | 1e−5 |
| | Vz (m/s) | 1e−5 |
| Satellite Clock Parameters | A0 (s) | 1e−11 |
| | A1 (s/s) | 1e−17 |
| | A2 (s/s$^2$) | 1e−22 |

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as to fall within the spirit and scope of the invention.

What is claimed is:

1. A method for recovering a data set of satellite parameters received at a navigational receiver of a satellite navigation system to assist the navigation receiver in satellite navigation, the method comprising:
   receiving delta satellite parameters for one or more satellites from a server, wherein the delta satellite parameters represent differences between original satellite parameters corresponding to a satellite specific reference time and reference satellite parameters corresponding to the satellite specific reference time;
   predicting the reference satellite parameters corresponding to the satellite specific reference time from previous satellite parameters for the one or more satellites; and
   adding the delta satellite parameters and their respective reference satellite parameters to recover the original satellite parameters corresponding to the satellite specific reference time for the one or more satellites.

2. The method of claim 1, wherein said predicting the reference satellite parameters corresponding to the satellite specific reference time from previous satellite parameters for a satellite comprises predicting a reference position, a reference velocity, and a reference satellite clock of the satellite corresponding to the satellite specific reference time from previous satellite parameters, and the original satellite parameters corresponding to the satellite specific reference time for the satellite comprise an original position, an original velocity, and an original satellite clock of the satellite corresponding to the satellite specific reference time.

3. The method of claim 2, wherein said predicting the reference position, the reference velocity, and the reference satellite clock of the satellite corresponding to the satellite specific reference time from previous satellite parameters comprises:
   computing the reference position of the satellite based on a numerical integration from a previous time to the satellite specific reference time using solar radiation pressure parameters, a previous velocity, and a previous position corresponding to the previous time;
   computing the reference velocity of the satellite based on a numerical integration from the previous time to the satellite specific reference time using the solar radiation pressure parameters, and the previous velocity corresponding to the previous time; and
   computing the reference satellite clock of the satellite based on calculating a satellite clock bias using time correction coefficients, and a time difference between the previous time and the satellite specific reference time.

4. The method of claim 2, wherein said predicting the reference position, the reference velocity, and the reference satellite clock of the satellite corresponding to the satellite specific reference time from previous satellite parameters comprises calculating the reference position, the reference velocity, and the reference satellite clock using an almanac corresponding to a previous time.

5. The method of claim 2, wherein said predicting the reference position, the reference velocity, and the reference satellite clock of the satellite corresponding to the satellite specific reference time from previous satellite parameters comprises calculating the reference position, the reference velocity, and the reference satellite clock using an ephemeris corresponding to a previous time.

6. The method of claim 1, wherein said predicting reference satellite parameters corresponding to the satellite specific reference time from previous satellite parameters for a satellite comprises obtaining a reference velocity of the satellite from a reference altitude of the satellite using a fixed relationship between orbital altitude and orbital velocity.

7. The method of claim 1, wherein the original satellite parameters corresponding to a first reference time for a first satellite comprise an original position of the first satellite corresponding to the first reference time, and wherein said predicting reference satellite parameters corresponding to a second reference time from previous satellite parameters for a second satellite comprises predicting a reference position of the second satellite corresponding to the second reference time using the original position of the first satellite corresponding to the first reference time when the first satellite and the second satellite share an orbital plane.

8. The method of claim 1, wherein said predicting reference satellite parameters corresponding to the satellite specific reference time from previous satellite parameters for the one or more satellites further comprises determining common reference satellite parameters corresponding to a common reference time for the one or more satellites from the reference satellite parameters corresponding to the satellite specific reference time for the one or more satellites using orbital integrations, and using the common reference satellite parameters to add to their respective delta satellite parameters to recover the original satellite parameters corresponding to the satellite specific reference time for the one or more satellites.

9. The method of claim 1, further comprising receiving a satellite mask at the navigational receiver, wherein the satellite mask identifies the one or more satellites for which the delta satellite parameters are received and for which the original satellite parameters corresponding to the satellite specific reference time are recovered.

10. The method of claim 1, further comprising receiving model flags for the one or more satellites at the navigation receiver, and wherein said predicting reference satellite parameters corresponding to the satellite specific reference time from previous satellite parameters for the one or more satellites comprises using the model flags to select models used for predicting reference solar radiation parameters for the one or more satellites.

11. The method of claim 1, further comprising receiving model flags for the one or more satellites at the navigation receiver, and wherein said predicting reference satellite parameters corresponding to the satellite specific reference time from previous satellite parameters for the one or more satellites comprises using the model flags to select models used for predicting reference satellite clocks for the one or more satellites.

12. The method of claim 1, further comprising:
receiving the delta satellite parameters as compressed data; and
decompressing the compressed delta satellite parameters before adding decompressed delta satellite parameters and their respective reference satellite parameters to recover the original satellite parameters corresponding to the satellite specific reference time for the one or more satellites.

13. The method of claim 12, wherein said decompressing the compressed delta satellite parameters comprises:
receiving flags for the one or more satellites at the receiver; and
referencing pre-coded data in a pre-coded data table using the flags to decompress the compressed delta satellite parameters before adding the decompressed delta satellite parameters and their respective reference satellite parameters to recover the original satellite parameters corresponding to the satellite specific reference time for the one or more satellites.

14. The method of claim 12, wherein said decompressing the compressed delta satellite parameters comprises using run length decoding technique to decompress the compressed delta satellite parameters before adding the decompressed delta satellite parameters and their respective reference satellite parameters to recover the original satellite parameters corresponding to the satellite specific reference time for the one or more satellites.

* * * * *